(No Model.)

A. WILLIAMS.
Weighing Scale.

No. 243,186. Patented June 21, 1881.

Witnesses:
G. B. Tuttle
H. A. Daniels

Inventor:
Aaron Williams
By W. Burris
Attorney

UNITED STATES PATENT OFFICE.

AARON WILLIAMS, OF INGLESIDE, PENNSYLVANIA.

WEIGHING-SCALE.

SPECIFICATION forming part of Letters Patent No. 243,186, dated June 21, 1881.

Application filed February 24, 1881. (No model.)

*To all whom it may concern:*

Be it known that I, AARON WILLIAMS, a citizen of the United States, residing at Ingleside, Allegheny township, in the county of Westmoreland and State of Pennsylvania, have invented certain new and useful Improvements in Weighing-Scales; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to scales for ascertaining the net weights of articles; and it consists of an adjustable beam having scales of weights corresponding to the scales of the weighing-beam, but numbered from the reverse end, and this adjustable beam is arranged parallel with the weighing-beam, so that by the proper adjustment of the adjustable beam the net weights of articles may be ascertained, as hereinafter fully described.

Figure 1:
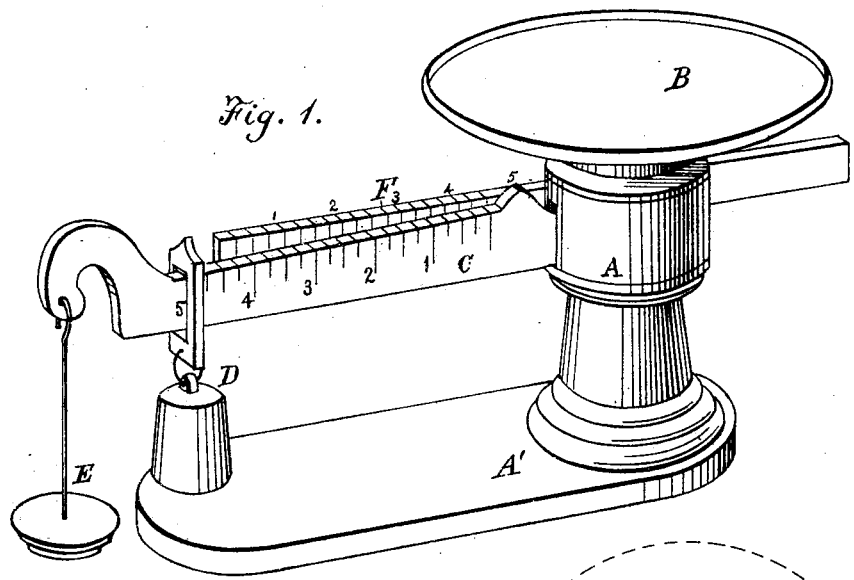
Figure 2:
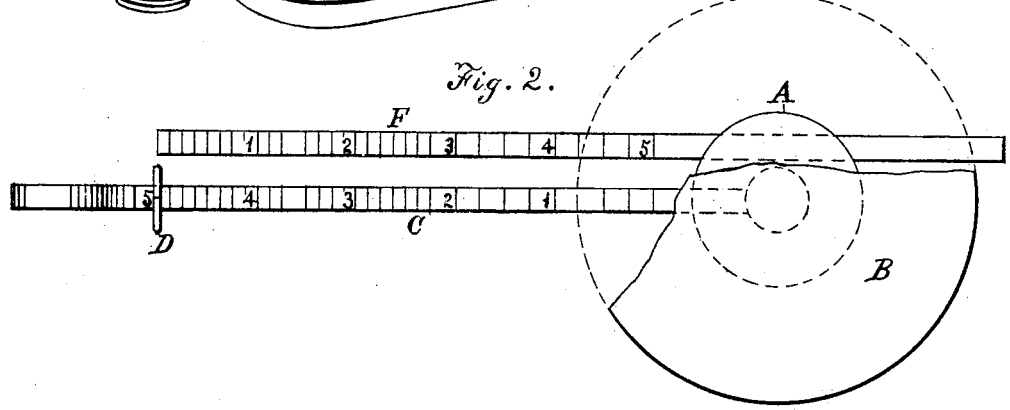
Figure 3:
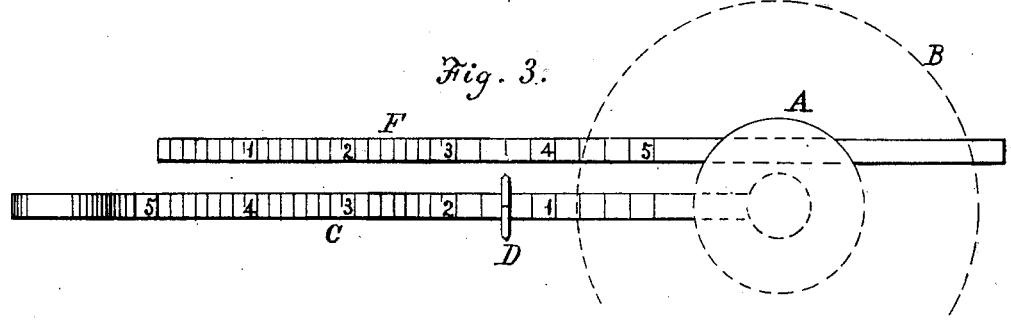

In the drawings, Figure 1 is a perspective view of scales having the adjustable beam. Fig. 2 is a plan view, showing the relative positions of the adjustable beam and the sliding weight when the gross weight is taken. Fig. 3 is a top view, showing the relative positions of the adjustable beam and sliding weight when the tare weight is taken, giving the net weight on the adjustable beam.

A is a hollow standard on a base, A', and is provided with a weighing-platform, B, beam C, sliding weight D, and weight-holder E, constructed in the usual manner.

F is a beam having scales corresponding with the scales on the beam C, but numbered from the reverse end, and is adjusted parallel with the beam C to slide in a slot in the standard.

The articles to be weighed being placed in a basket, cask, bucket, or other receptacle on the platform of the scales, and the gross weight taken, being, for example, five pounds, the end of the beam F is adjusted at the notch 5. (See Fig. 2 of the drawings.) The contents are then removed, and the empty receptacle placed upon the platform, weighing, for example, one and one-half pound, the net weight of three and a half pounds is shown on the beam F by counting from the end to the notch opposite the weight D, as shown in Fig. 3.

What I claim as new, and desire to secure by Letters Patent, is—

In weighing-scales for ascertaining the net weights of articles, the combination, with the weighing-beam C, provided with scales numbered from the platform outward, of the adjustable beam F, having the scale numbered from the outer end corresponding with the scale on the weighing-beam, and arranged to slide in a slot in the standard A, substantially as described.

In testimony whereof I affix my signature in presence of two witnesses.

AARON WILLIAMS.

Witnesses:
    JAMES H. WOOLSLAYER,
    J. B. MILLER.